US006216583B1

(12) United States Patent
Klinger et al.

(10) Patent No.: US 6,216,583 B1
(45) Date of Patent: Apr. 17, 2001

(54) PISTON PUMP FOR HIGH PRESSURE FUEL SUPPLY

(75) Inventors: Horst Klinger, Ludwigsburg; Uwe Kuhn, Riederich; Bernd Rosenau, Tamm; Peter Traub, Stuttgart; Thomas Goettel, Schwaikheim; Gerd Loesch, Stuttgart; Sandro Soccol, Bietigheim-Bissingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,654

(22) PCT Filed: Jun. 30, 1998

(86) PCT No.: PCT/DE98/01791

§ 371 Date: Mar. 11, 1999

§ 102(e) Date: Mar. 11, 1999

(87) PCT Pub. No.: WO99/02852

PCT Pub. Date: Jan. 21, 1999

(30) Foreign Application Priority Data

Jul. 11, 1997 (DE) ............................................. 197 29 793

(51) Int. Cl.[7] ........................................................ F16J 9/00

(52) U.S. Cl. ............................ 92/129; 417/470; 184/6.8; 123/90.35

(58) Field of Search ............................... 92/129; 184/6.8, 184/6.9, 101; 417/470, 471; 123/90.35

(56) References Cited

U.S. PATENT DOCUMENTS

| | | | | |
|---|---|---|---|---|
| 2,821,970 | * | 2/1958 | Line | 92/129 |
| 5,127,374 | * | 7/1992 | More et al. | 123/90.35 |
| 5,775,203 | * | 3/1999 | Osborn et al. | 92/129 |
| 5,797,364 | * | 8/1998 | Meek et al. | 123/90.35 |
| 5,884,608 | * | 3/1999 | Cooke | 417/470 |
| 6,073,537 | * | 6/2000 | Noda et al. | 92/129 |

* cited by examiner

*Primary Examiner*—Edward K. Look
*Assistant Examiner*—Hermes Rodriguez
(74) *Attorney, Agent, or Firm*—Ronald E. Greigg; Edwin E. Greigg

(57) ABSTRACT

A piston pump of the roller tappet type for high-pressure fuel delivery in fuel injection systems of internal combustion engines, particularly in common rail injection systems. A drive shaft that is supported in the pump housing and has a number of cam-like projections in the circumference direction. At least one tappet that is disposed in a cylinder chamber radially with regard to the drive shaft and in its radially inner end region has a rotatable roller which is supported so that it can roll in the circumference direction against the drive shaft in the region of its projections in order to reduce the wear in the region of the roller bearing. The pump is embodied so that a lubricant supply opening that leads from the circumference of the tappet and feeds into the radially inner tappet end region supporting the roller and at least during a part of the stroke, communicates with a lubricant supply line of the housing, which line feeds into the cylinder chamber.

28 Claims, 7 Drawing Sheets

PISTON PUMP FOR HIGH PRESSURE FUEL SUPPLY

The invention relates to a piston pump, in particular a radial piston pump of the roller tappet type for high-pressure fuel delivery in fuel injection systems of internal combustion engines, particularly in a common rail injection system. A drive shaft that has a number of cam-like projections in the circumference direction and with at least one tappet that is disposed radially with regard to the drive shaft. In its radially inner end region, this tappet has a rotatable roller, which is reliably supported against the drive shaft in the region of its projections so that this roller can roll in the circumference direction.

It goes without saying that with a piston pump of this kind, preferably a number of radially disposed tappets is provided, which on their end remote from the drive shaft, either rest against a piston that defines a high-pressure side or define the high-pressure side themselves and thus directly perform a displacement or compression function.

Particularly in the above-mentioned common rail applications, the piston pump is not used for direct injection into the motor cylinder, but is instead used for delivery into a high-pressure reservoir. For functional and cost-related reasons, the aim is to reduce the number of separate supply units in comparison to conventional injection systems (e.g. series pump, plug-in pump) by virtue of the fact that—as already mentioned at the beginning—the drive shaft of the piston pump has a number of projections in the circumference direction, which consecutively produce a stroke motion in a radial piston or radial tappet during a rotation of the drive shaft (multiple cam system).

However, this leads to an increased load on the drive components, in particular of the tappet and the rotatably supported roller. In comparison to single-cam systems, the delivery times of the radial piston or radial tappet are increased while the relief times between the delivery phases are shortened. As a result of this, there is less time available for the formation of a lubricating film or a regeneration of the lubricating film in the region of the bearing of the roller. In piston pumps of the type mentioned above, this leads to increased wear as a result of insufficient lubrication in the region of the bearing of the roller. Because of the long delivery times, the lubricating oil is pressed out of the bearing gap and cannot penetrate back into the bearing location in sufficient quantity during the relatively short relief times.

The object of the current invention, therefore, is to reduce the wear in piston pumps of this generic type, without having to reduce the tappet load (piston force, piston or tappet stroke, relative speed of the roller in relation to its bearing).

This object is attained by means of a piston pump of the type mentioned above, which is characterized according to the invention by means of a lubricant supply opening that leads from the circumference of the tappet and feeds into the radially inner tappet end region supporting the roller and at least during a part of the stroke, communicates with a lubricant supply line of the housing, which line feeds into the cylinder chamber.

The proposal is therefore made according to the invention to produce a lubrication of the bearing location of the roller by means of the lubricant supply opening embodied in the tappet. According to the invention, the lubricant supply opening, which preferably communicates with a lubricating oil circuit of the motor, feeds either directly into the region of the slide surfaces or into the so-called roller chamber, which is defined by the roller axle and by the end region of the tappet that contains the roller.

Since lubricant is introduced by way of the lubricant supply opening either directly into the boss or into the roller chamber of the tappet, there is a sufficient quantity of lubricant available. In the first instance, the lubricant is introduced directly into the region of the surfaces sliding against each other and in the second instance, there is always so much lubricant available in the roller chamber that the lubricant can nevertheless penetrate in a sufficient quantity into the bearing location during the relatively short relief times mentioned at the beginning.

The piston pump can be embodied in a particularly simple manner from a technical manufacturing standpoint so that each tappet has a roller with rigidly attached bearing pins, with which the roller is rotatably supported in the end region of the tappet.

The roller, however, can also be rotated in relation to a bolt that extends parallel to the rotation axis of the drive shaft and can be supported by this bolt in the end region of the tappet.

As already indicated above, it turns out to be particularly advantageous if the lubricant supply opening in the end region of the tappet feeds into at least one tappet boss that is for supporting the bearing pins or the bearing bolt of the roller. It would also be conceivable for the bearing pins or the bolt to be embodied with an annular groove in the boss region, which groove coincides with the lubricant supply opening.

It has also turned out to be advantageous if the bolt is fixed in relation to the tappet and has a lubricant conducting device that communicates with or coincides with the lubricant supply opening and leads to the surfaces of the bolt/roller pairing that slide against each other. With a fixed bolt, these slide surfaces are disposed on the inside between the roller and bolt. The lubricant conducting device is thus used to transport the lubricant, which is supplied into the boss or into the roller by way of the lubricant supply opening, to the surfaces of the bolt/roller pairing that slide against each other. If the lubricant supply opening feeds into the boss region, then according to one variant of the invention, the proposal is made that the lubricant conducting device be constituted by a lateral bore in the bolt and another bore in the bolt that extends obliquely in relation to the longitudinal direction of the bolt and feeds into the region of the slide surfaces. The lubricant thus travels via the lubricant supply opening into the lateral bore that extends essentially in the radial direction, into the interior of the bolt, and from there, into the region of the slide surfaces by way of the other bore that extends obliquely to the longitudinal direction of the bolt.

The lubricant conducting device, however, in a manner that is simple and therefore advantageous from a technical manufacturing standpoint, could also be constituted by a surface groove that runs in the longitudinal direction of the bolt and extends into the region of the slide surfaces.

The surface groove can have an intrinsically arbitrary cross sectional shape; it has turned out to be advantageous if it is embodied as convexly rounded in terms of the cross section in the longitudinal direction of the bolt. Moreover, it has turned out to be advantageous if the surface groove is closed in the longitudinal direction of the bolt, i.e. if it does not feed to the end faces of the bolt, in order to prevent the lubricant from escaping in this undesired direction.

The lubricant conducting device could furthermore be constituted by a flattening on the bolt circumference extending in the longitudinal direction of the bolt, which is particularly easy to produce from a technical manufacturing standpoint.

It also turns out to be advantageous if a groove extending in the stroke direction is provided in the circumference surface of the tappet and/or in the inner surface of the cylinder. In the reciprocating motion of the tappet, the groove assures that in each stroke position, the lubricant supply opening of the tappet communicates with the lubricant supply line of the housing, which line feeds into the inner surface of the cylinder.

In order to be able to control the lubricant flow rate in the system, the proposal is made to provide a throttle device in the lubricant supply line of the housing, i.e. upstream of the tappet in the supply direction. This achieves freedom with regard to the dimensioning and efficiency of the lubricant supply.

In another embodiment of the invention, the bolt and/or the roller are comprised of ceramic material and therefore excel in comparison to metallic slide pairings with regard to their capacity for temperature loading and wear.

In a quite particularly advantageous modification of the invention, the bolt has a structured circumference surface that preferably has groove-shaped recesses that extend along the bolt in an intrinsically arbitrary form, or lubricating pockets can be provided. By means of this surface structuring, on the one hand, a lubricant transport into the gap between the bearing pin and the boss or between the roller and the particular fixed bolt is produced by means of the particular capillary action of the structure, and on the other hand, a storage of the lubricating oil is produced in the loaded zone (lubricating pocket action). Preferable dimensions of the surface structures can be inferred from advantages set forth herein.

It has also turned out to be advantageous if an intermediary bush is provided between the bolt and the roller since this reduces the relative speed of the sliding partners and consequently reduces the energy conversion in the mixed friction or solids friction that occurs.

Other features, details, and advantages of the invention can be inferred from the accompanying claims and from the graphic representation and subsequent description of preferred embodiments of the invention.

DETAILED DESCRIPTION

Figure 1:
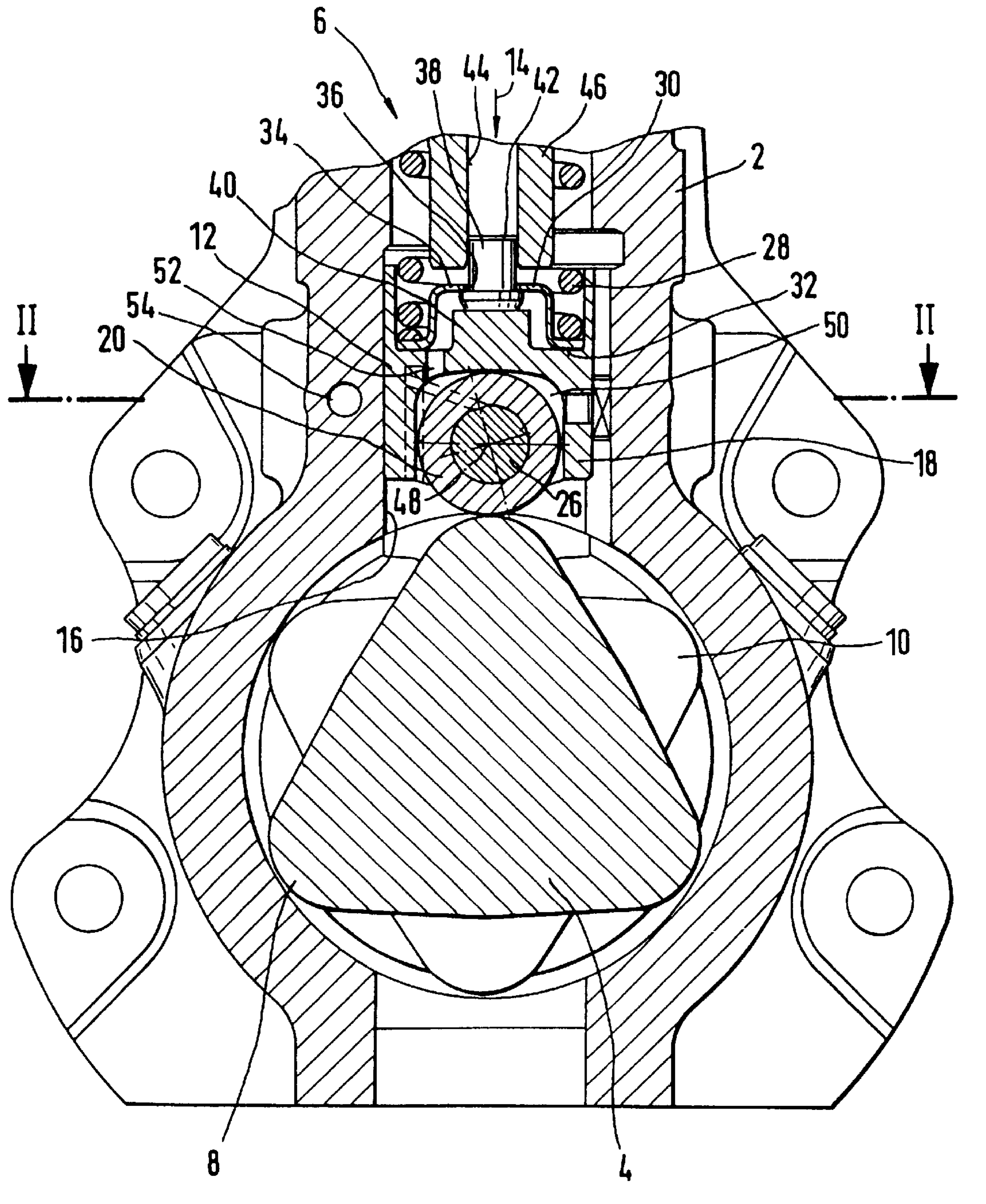
FIG. 1 shows a partial sectional view through a piston pump according to the invention.
Figure 2:
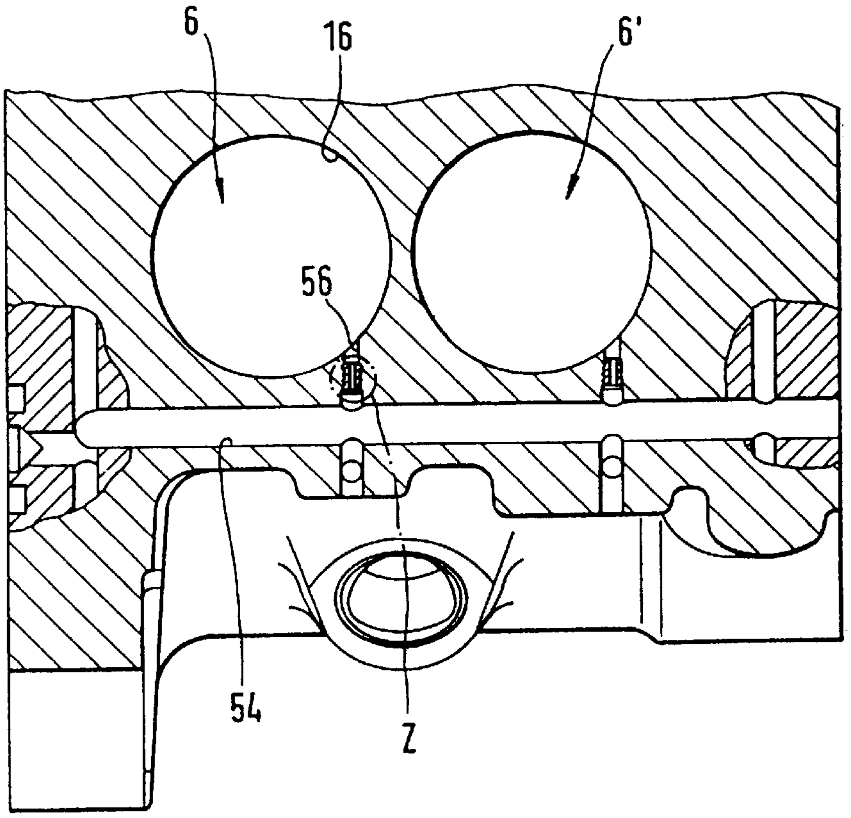
FIG. 2 shows a sectional view with a detail depiction along the line II—II in FIG. 1.

FIGS. 1 and 2 show a piston pump with a pump housing 2 in which a drive shaft 4 as well as a number of roller tappet compression units 6 are disposed in the radial direction or in a star shape in relation to one another. The drive shaft 4 has three cam-like projections 8 in the circumference direction, whose radially outermost points are respectively offset from one another by 120° in the circumference direction and each constitute the apex of an even curvature. Furthermore, a corresponding cam-like formation 10 of the drive shaft 4 is provided in a plane that extends parallel to the plane of the figures; this formation, however, is rotated by 60° in relation to the first one and cooperates with another roller tappet compressor unit 6' (FIG. 2).

Figure 3:
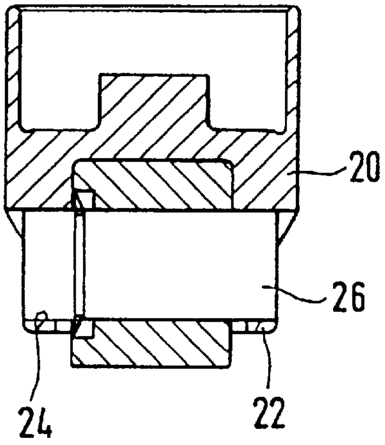
FIGS. 3 and 3*a* show two different sectional views of a tappet according to FIG. 1.
Figure 3A:
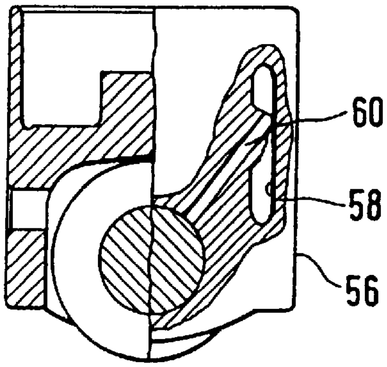

The roller tappet compressor unit 6 includes a tappet 12 that is provided so that it can execute a reciprocating motion in the radial direction 14 in a cylinder chamber 16 of the pump housing 2. A roller 20 is rotatably supported on the end section 18 of the tappet oriented toward the drive shaft 4. To this end, the end section 18 constitutes a bolt seat 22 (FIG. 3) in which bosses 24 are provided in order to receive a bolt 26 for rotatably supporting the roller 20. The roller 20 rolls in the circumference direction against the cam-like projections 8 of the drive shaft 4 and thus produces a reciprocating motion of the tappet 12.

On its end remote from the drive shaft 4, the tappet 12 is prestressed inward in the radial direction 14 toward the drive shaft 4 by means of a spring 28. The spring 28 is supported on the tappet end against a spring plate 30, which is pressed with its outer region 32 against the tappet 12. In the inner region 34, a central opening 36 is provided, through which a piston 38 is guided. The piston 38 is supported on the tappet end against a central projection 40 of the tappet 12 and protrudes with its opposite free end 42 into a high-pressure side cylinder chamber 44, which is constituted by a flange-shaped section 46 of the pump housing 2. With the reciprocating motion of the tappet 12, the piston 38 in the high-pressure side cylinder chamber 44 is set into a reciprocating motion in the compression direction or in the suction direction.

The high-pressure side cylinder chamber 44 communicates in a manner not shown with an intake line and a high-pressure line that leads to a common rail reservoir. The end section 18 on the drive axle end and the bolt seat 22 of the tappet 12 form a roller chamber 50 above the longitudinal axis 48 of the bolt. By way of a ventilation opening 52, this roller chamber 50 communicates with the end of the tappet 12 remote from the drive shaft, which end supports the spring 28, in order not to hinder the reciprocal motion of the tappet 12 by means of compression/vacuum production.

Figure 2A:
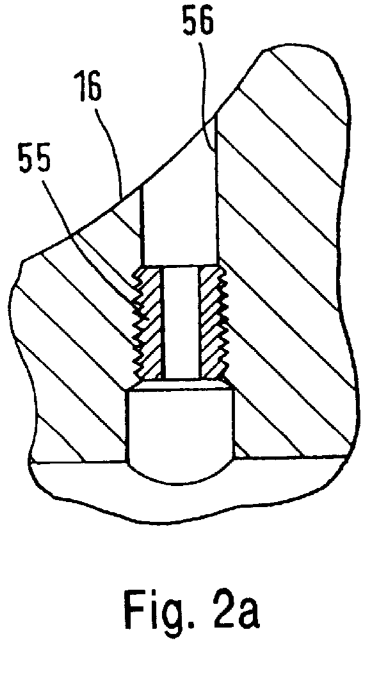
FIG. 2*a* is an enlarged view of the insert 2.

Furthermore, a lubricant supply conduit 54 is provided in the pump housing 2 and cooperates with a lubricant supply of a vehicle motor. A branch line 56 not shown in FIG. 1 with a throttle device 55 (FIG. 2*a*) leads away from the lubricant supply conduit 54 and feeds into the inner cylindrical surface of the cylinder chamber 16. A groove 58 (FIG. 3) that extends in the stroke direction is provided at the corresponding location in the outer circumference surface 56 of the tappet 12. A lubricant supply opening 60 extends from this groove 58 into the tappet and feeds into the region of the boss 24, i.e. into the region of the bearing location of the bolt 26.

Figure 4:
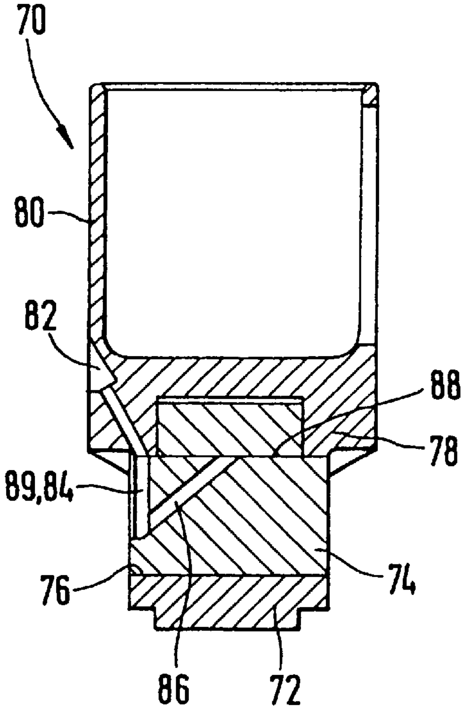
FIGS. 4 and 4*a* show a sectional view and a side view, respectively, of a tappet that is embodied according to the invention, with a lubricant supply opening.
Figure 4A:
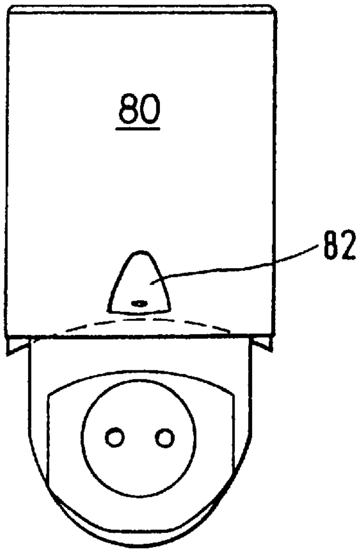

FIG. 4 shows another embodiment of a tappet 70, with a roller 72 that is supported by way of a bolt 74 in the bosses 76 of the bolt seat 78 of the tappet 70. A lubricant supply opening 82 is in turn provided, which leads from the outer circumference surface 80 of the tappet 70, and this lubricant supply opening is embodied in the form of a straight bore that feeds into the apex of the boss 76. The bolt 74 is embodied as a fixed bolt and is oriented in the bosses 76 so that a bore 84 provided in the radial direction of the bolt 74 communicates with the mouth of the lubricant supply opening 82 in the boss 76. The radial bore 84 in the bolt 74 extends approximately to the center of the bolt. From there, another bore 86 extends obliquely to the bolt axis and feeds into the bolt circumference surface 88 in the region of the surfaces of the bolt 74 and roller 72 that slide against each other. In this manner, lubricant can be brought into the region of the surfaces of the bolt 74 and roller 72 that travel against each other, by way of the lubricant supply opening 82 in the tappet and the lateral bore 84, as well as the other bore 86 that adjoins it. The bores 84 and 86 thus constitute a lubricant conducting device 89. As can be seen from the depiction on the right in FIG. 4*a*, in contrast to FIGS. 1, 3, no groove extending in the stroke direction is provided on the circumference surface 80 of the tappet. A groove of this kind, however, could be provided in the inner cylinder surface in order to assure a connection to the lubricant circuit over the entire stroke in a particularly advantageous manner.

Figure 5:
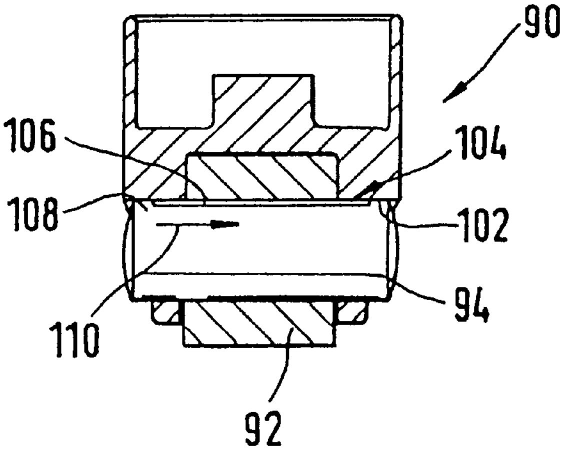
FIGS. 5–5*g* show two additional sectional views of another embodiment of a tappet according to the invention, as well as different views of different embodiments of a bolt for the tappet roller.
Figure 5A:
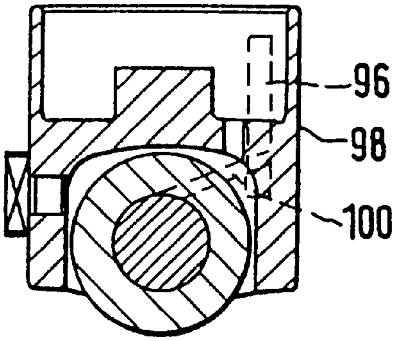
Figure 5B:
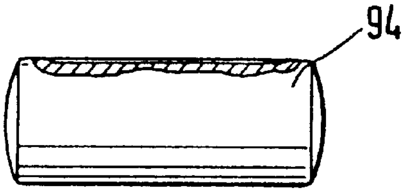
Figure 5C:
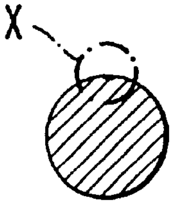
Figure 5D:
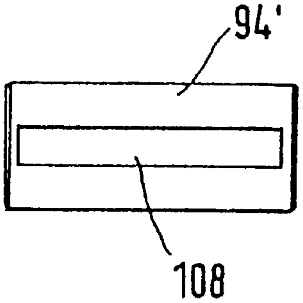
Figure 5E:
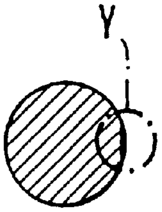
Figure 5F:
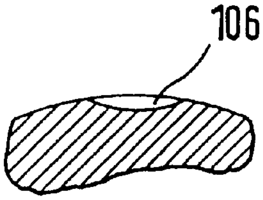
Figure 5G:
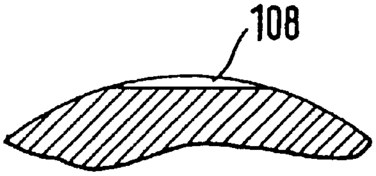

FIGS. 5 and 5*a* show a tappet 90 with a roller 92 and a fixed bolt 94. The tappet 90 in turn has a longitudinal groove 96 extending in the stroke direction on its outer circumference surface 98, from which a lubricant supply opening 100 leads, which feeds into the region of the boss 102. The bolt 94 has a lubricant conducting device 104 in the form of a groove 106 that is disposed in the circumference surface of the bolt 108 and extends in the longitudinal direction of the bolt. By way of the lubricant conducting device 104, the lubricant supplied via the lubricant supply opening 100 into the boss region is brought in the axial direction (arrow 110) into the region of the surfaces of the roller 92 and bolt 94 that slide against each other. The longitudinal groove 106 is closed in the axial direction of the bolt and is embodied as convexly rounded in cross section (see detail X). In FIGS. 5*d* and 5*e*, another alternative embodiment in the form of a bolt 94' is depicted, which in lieu of the longitudinal groove 106 has a flattening 108, which is also depicted in the detail Y.

Figure 6:
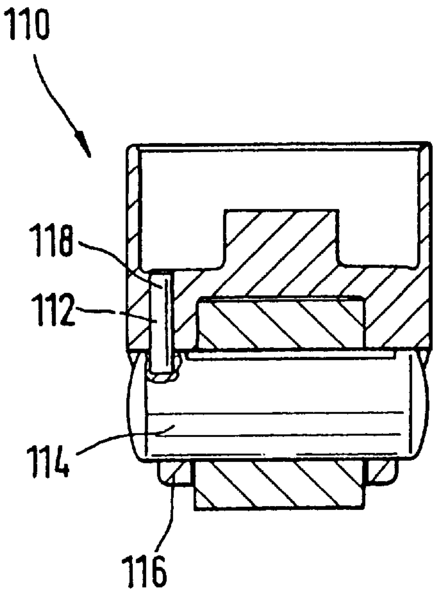
FIGS. 6 and 6*a* show different a sectional views of the tappet according to FIG. 4, with a rotation prevention means of the bolt.
Figure 6A:
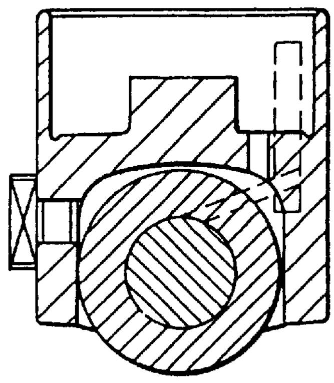

FIGS. 6 and 6*a* show a tappet 110, that corresponds to the one in FIG. 5 and is provided with a rotation prevention means 112 of the bolt 114 in relation to the boss 116. The rotation prevention means 112 is constituted by a pin 118 that is inserted through the tappet 110 radial to the longitudinal direction of the bolt.

Figure 7:
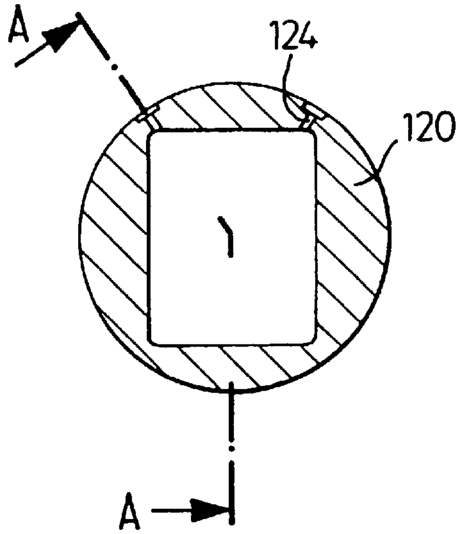
FIGS. 7 and 7*a* show two different sectional views of a tappet with a lubricating oil supply directly into the roller chamber.
Figure 7A:
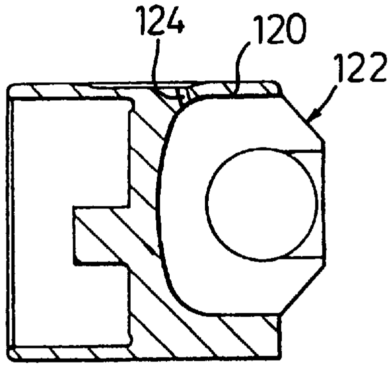

FIGS. 7 and 7*a* show another embodiment according to which a tappet 120 is embodied with lubricant supply openings 124 feeding into the roller chamber 122. The lubrication thus takes place here by way of the roller chamber 122. This embodiment turns out to be advantageous in connection with a loose bolt. By means of this, at least an increased supply of lubricating oil is achieved with a machining and assembly expenditure that is relatively low from a technical manufacturing standpoint.

Figure 8:
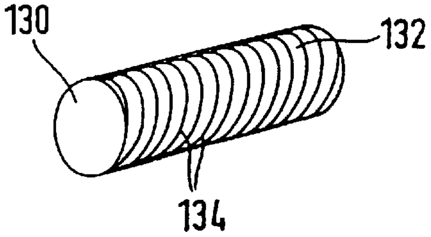
FIGS. 8, 8*a*, 8*b* and 8*c* show various surface structures of tappet bolts.
Figure 8A:
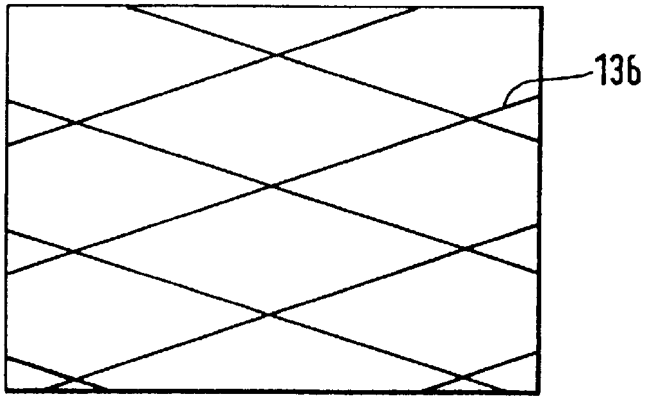
Figure 8B:
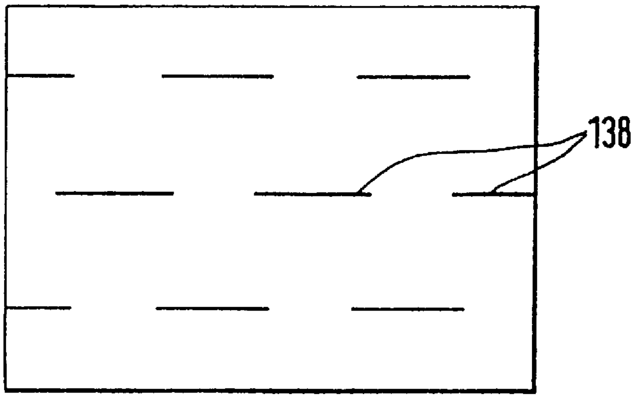
Figure 8C:
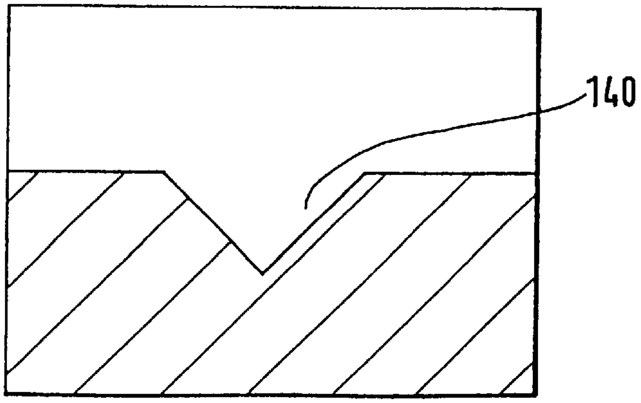

In FIGS. 8–8*c*, a bolt 130 is shown with a groove-shaped structure 134 that extends helically on its outer circumference surface 132. Other surface structures 136 (FIG. 8*a*) (waffle pattern) and 138 (FIG. 8*b*) in the form of separate lubricant pockets are represented in FIG. 8. Furthermore, a cross section of a V-shaped groove profile 140 (FIG. *c*) is shown, which preferably has a depth of 40 $\mu$m and a width of 70 $\mu$m in the vicinity of the circumference surface. It should be emphasized that even with a structure like 136, additional lubricant pockets can be provided in order to produce a combined effect.

Figure 9:
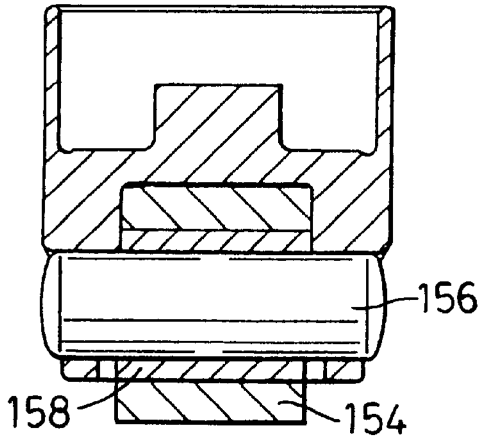
FIGS. 9 and 9*a* show two different sectional views of a tappet with an additional intermediary bush between the bolt and roller.
Figure 9A:
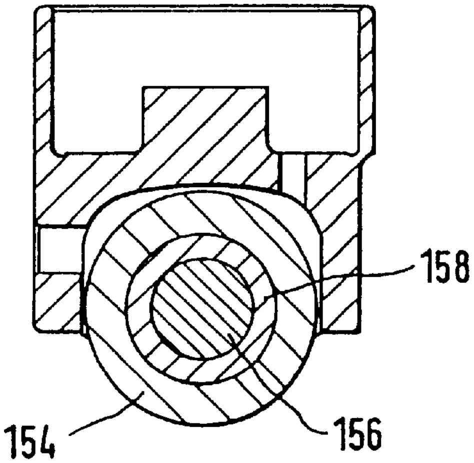

Finally, FIGS. 9 and 9*a* show a tappet in which an intermediary bush 158 that travels in relation to the bolt 156 and the roller 154 is provided between the roller 154 and the bolt 156 in order to reduce the relative speed of the friction partners.

The foregoing relates to a preferred exemplary embodiment of the invention, it being understood that other variants and embodiments thereof are possible within the spirit and scope of the invention, the latter being defined by the appended claims.

What is claimed is:

1. A high-pressure fuel pump of the roller tappet type, for high-pressure fuel delivery in fuel injection systems of internal combustion engines, which have a common rail injection system, comprising a drive shaft (4) that is supported in a pump housing (2), said drive shaft includes a number of cam-like projections (8) in a circumference direction, at least one tappet is disposed in a cylinder chamber (16) radially with regard to the drive shaft (4), and in a radially inner end region (18), said tappet has a rotatable roller (20), which is supported so that the rotatable roller can roll in the circumference direction against the drive shaft (4) in a region of the projections (8), a lubricant supply opening (60, 82, 100) leads from the circumference of the tappet (12, 70, 90) and feeds into the radially inner tappet end region (18) supporting the roller (20, 72, 92) and at least during a part of the stroke, communicates with a lubricant supply line (54, 56) of the housing (2), which line feeds into the cylinder chamber (16).

2. The piston pump according to claim 1, in which the lubricant supply opening (60, 82, 100) communicates with a lubricant circuit of an engine.

3. The piston pump according to claim 1, which includes a roller with rigidly attached bearing pins that are rotatably supported in the tappet.

4. The piston pump according to claim 2, which includes a roller with rigidly attached bearing pins that are rotatably supported in the tappet.

5. The piston pump according to claim 1, in which the roller (20, 72, 92, 114) rotates in relation to a bolt (26, 74, 94, 114) that extends parallel to a rotational axis of the drive shaft (4) and is supported by way of said bolt (26, 74, 94, 114) on the radially inner end region (18) of the tappet (12, 70, 90, 110).

6. The piston pump according to claim 2, in which the roller (20, 72, 92, 114) rotates in relation to a bolt (26, 74, 94, 114) that extends parallel to a rotational axis of the drive shaft (4) and is supported by way of said bolt (26, 74, 94, 114) on the radially inner end region (18) of the tappet (12, 70, 90, 110).

7. The piston pump according to claim 1, in which the lubricant supply opening (60, 82, 100) in the end region of the tappet (12, 70, 90, 110) feeds into at least one boss (76, 116) of the tappet.

8. The piston pump according to claim 2, in which the lubricant supply opening (60, 82, 100) in the end region of the tappet (12, 70, 90, 110) feeds into at least one boss (76, 116) of the tappet.

9. The piston pump according to claim 5, in which the bolt (26, 74, 94, 114) is fixed in relation to the tappet (12, 70, 90, 110) and has a lubricant conducting device (89, 104), which communicates with the lubricant supply opening (60, 82, 100) and leads to the slide surfaces of the bolt/roller pairing.

10. The piston pump according to claim 7, in which the bolt (26, 74, 94, 114) is fixed in relation to the tappet (12, 70, 90, 110) and has a lubricant conducting device (89, 104), which communicates with the lubricant supply opening (60, 82, 100) and leads to the slide surfaces of the bolt/roller pairing.

11. The piston pump according to claim 9, in which the lubricant conducting device (89) is constituted by a lateral bore (84) and another bore (86) that extends obliquely in relation to the longitudinal direction of the bolt and feeds into the region of the slide surfaces.

12. The piston pump according to claim 9, in which the lubricant conducting device (104) is constituted by a surface groove (106) that runs in a longitudinal direction of the bolt and extends into the region of the slide surfaces.

13. The piston pump according to claim 12, in which the surface groove (106) is embodied as convexly rounded in cross section, viewed in a longitudinal direction of the bolt.

14. The piston pump according to claim 13, in which the surface groove (106) is closed in the longitudinal direction of the bolt.

15. The piston pump according to claim 9, in which the lubricant conducting device is embodied by a flattening (108) that is disposed on a circumference surface of the bolt and extends in a longitudinal direction of the bolt.

16. The piston pump according to claim 1, in which a bolt (114) is secured against rotation relative to the tappet (110) by means of a rotation prevention means (112).

17. The piston pump according to claim 2, in which a bolt (114) is secured against rotation relative to the tappet (110) by means of a rotation prevention means (112).

18. The piston pump according to claim 1, in which a groove (58, 96), which extends in the stroke direction and leads from the lubricant supply opening (60, 82, 100) in the circumference surface of the tappet (12, 70, 90), is provided in the circumference surface and/or in the inner cylinder surface.

19. The piston pump according to claim 1, in which a throttle device (55) is provided upstream of the tappet (12) in the lubricant supply (54, 56).

20. The piston pump according to claim 1, in which the bolt and/or the roller are comprised of ceramic material.

21. The piston pump according to claim 20, in which the bolt and/or the roller are comprised of silicon nitride or zirconium oxide.

22. The piston pump according to claim 20, in which the bolt (130) has a structured circumference surface (132).

23. The piston pump according to claim 22, in which the structured circumference surface (132) has groove-shaped recesses (134), in a form of a helix or a crisscross helix.

24. The piston pump according to claim 22, in which the structured circumference surface has lubricant pockets (138).

25. The piston pump according to claim 22, in which the depth of the surface structures is from about 0.005 to about 0.2 mm.

26. The piston pump according to claim 22, in which the width of the surface structures is from about 0.010 to about 0.2 mm.

27. The piston pump according to claim 5, in which an intermediary bush (158) is provided between the bolt (156) and the roller (154).

28. The piston pump according to claim 1, which comprises a solid roller clipped into a roller chamber by spring clips that press against a circumference of the solid roller.

* * * * *